C. L. FERMAN.
PRESSURE TAP.
APPLICATION FILED JAN. 13, 1909.
969,355.
Patented Sept. 6, 1910.
2 SHEETS—SHEET 1.
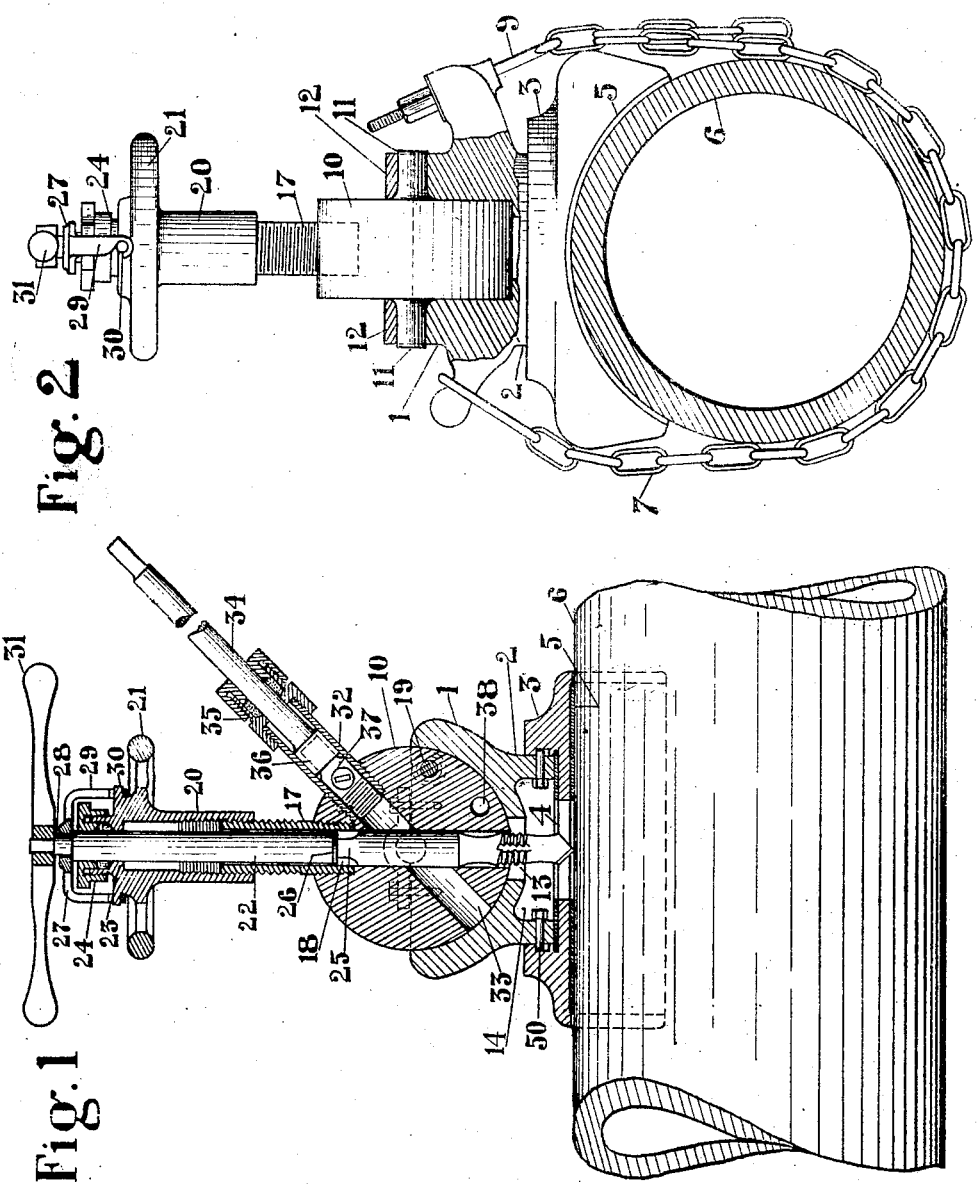
WITNESSES:
INVENTOR
CYRAL L. FERMAN
BY
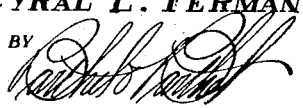
ATTORNEYS

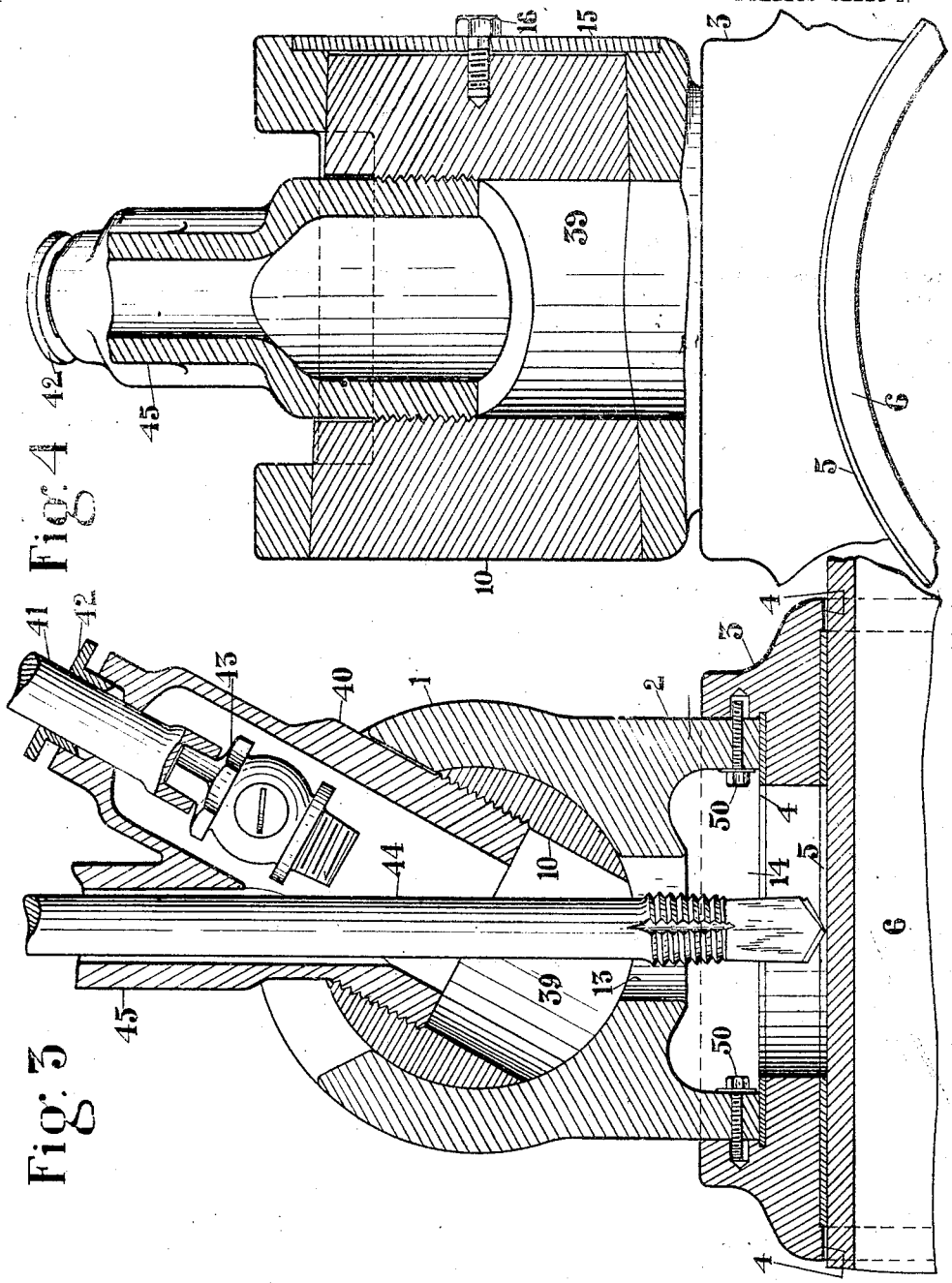

UNITED STATES PATENT OFFICE.

CYRAL L. FERMAN, OF MILAN, MICHIGAN.

PRESSURE-TAP.

969,355.   Specification of Letters Patent.   Patented Sept. 6, 1910.

Application filed January 13, 1909. Serial No. 472,100.

*To all whom it may concern:*

Be it known that I, CYRAL L. FERMAN, a citizen of the United States of America, residing at Milan, in the county of Washtenaw and State of Michigan, have invented certain new and useful Improvements in Pressure-Taps, of which the following is a specification, reference being had therein to the accompanying drawings.

This invention relates to a pipe drilling machine adapted for boring and tapping a gas or water service main under pressure, and more particularly to certain features thereof whereby adequate support is given the boring and tapping tools, and whereby there is little surface exposed to pressure so that there is no difficulty in preventing leakage.

The invention consists in the matters hereinafter set forth, and more particularly pointed out in the appended claims.

Referring to the drawings, Figure 1 is a view in longitudinal vertical section of a machine embodying features of the invention. Fig. 2 is a view, partially in section and partially in elevation, taken at right angles to Fig. 1. Fig. 3 is a view in section and partially broken away, of a modified form of the invention. Fig. 4 is a view at right angles to Fig. 3.

In the drawings, a casing 1 has a chambered foot 2 adapted to be stepped in a counterbored aperture of any one, 3, of a number of interchangeable shoes, the lower face of which is curved to conform to a pipe or main of a certain diameter, each shoe being arranged to fit one standard size of pipe. A gasket 4 is interposed between the foot and shoe, and a packing sheet 5 is used to form a close joint between the shoe and any pipe, indicated at 6, to which it may be applied. To facilitate removal of the machine intact, cap screws 50 loosely interlocking with a groove in the shoe, or other like means are employed to hold the casing and shoe together. A chain 7, or other flexible means, engaging a lug on one side of the casing, and drawn taut around the main by a bolt 9 on the other side, into which the chain is hooked, affords a convenient means of clamping the machine in place on the main which it is desired to tap.

A circular member 10 is rotatably secured in the upper end of the casing 1 in such manner as to rock or rotate in a plane transverse to the axis of any pipe to which the casing may be attached. The member may be mounted on suitable journals 11 engaging bearing boxes 12, the latter being of any usual construction whereby the parts may be taken up for wear, and the member having a close sliding fit both with the bottom and sides of the recess so that it is in effect a closure adapted to cut off an aperture 13 connecting the recess with the chamber 14 in the foot 2. Or, as indicated in Figs. 3 and 4, the casing may be horizontally taperbored and the member correspondingly tapered and rotatably secured in the aperture by a washer 15 seated in the counterbored smaller end of the aperture and an axial cap screw 16, having a squared, keyed or splined upper portion engaging a closely fitting aperture in the washer.

A tube 17 is screw-threaded into or otherwise secured in one end of a diametrically disposed tap guide aperture 18 through the movable member which may be brought in axial register with the aperture 13 by turning the disk and locking it with a pin 19 or the like passing through registering apertures in the casing and disk. A sleeve 20 provided with a hand-wheel 21 or like means by which it may be readily turned, is interiorly screw-threaded to engage the outwardly screw-threaded end of the tube 17. A spindle 22 is rotatable and reciprocable through an apertured cross wall 23 in the outer end of the sleeve and a packing gland 24 thereon of any preferred type, and has a socket at its inner end to receive the shank of a combination drill and tap 25 or other like tool whose body is preferably made to nicely fit the tap guide aperture 18. A collar or flange 26 on the inner end of the spindle prevents its complete withdrawal from the sleeve. The spindle may be interlocked with the sleeve to be forced thereby toward the main by a yoke 27 rotatably engaging a reduced portion 28 near the upper end of the spindle with depending arms 29 adapted to hook over pins or lugs 30 on the sleeve. The squared upper end of the spindle is adapted to receive an ordinary die stock 31 or other preferred form of handle by which it may be readily turned. A second tube 32 is secured in one end of a diametrically disposed plug guide aperture 33 oblique to and intersecting the aperture 18, and a shaft 34 is rotatable and longitudinally reciprocable therein through a stuffing box 35 of any preferred type, on the outer end of the tube. The outer end of the shaft is squared or otherwise fitted for reception of a die stock or like operating handle, and its inner end, which has a retaining flange 36 limiting its outward movement, is recessed or otherwise fitted as a cap wrench to engage a pipe plug 37 or any other pipe fitting which may be inserted and screwed home in the tapped hole formed by the tap when the movable member is rocked over so that the aperture 33 is alined with the tapped hole, the locking pin 19 being inserted through a corresponding aperture 38 in the said rotatable member.

Where a tap and drill is to be used of sufficient diameter to require no steadying, the movable member is provided with a single large diametrical aperture 39 (Figs. 3 and 4) into one end of which a single bonnet 40 is screwed or otherwise closely fitted, with a stem 41 passing through a packing gland 42 by which a large globe valve or like fitting 43 may be inserted in the hole left by a tool 44 which may be forced obliquely through the aperture 39 by exterior tube, sleeve and spindle yoke secured on an oblique hollow boss 45 of the bonnet and arranged as in the first described form of device.

In operation, the casing is inserted in a shoe corresponding in curvature to the main to be tapped, preferably with the disk in a plane parallel to the axis of curvature of the sleeve, after the proper tap drill is inserted in the top guide aperture and spindle socket, and the corresponding plug fitting or nipple is placed in the other guide aperture or in the bonnet in engagement with the nipple shaft. The machine is then clamped in place, and the tap drill worked through the wall of the main, the operator holding it to its work by feeding it down with the outer sleeve which is placed in engagement with the spindle yoke. The chips work out into the chamber of the casing. When the tapping is completed, the tap drill is run back clear of the hole, and the yoke disengaged from the sleeve, allowing the tap spindle and drill to be withdrawn past the line of travel of the plug or nipple shaft. The locking pin is then withdrawn, the movable member is rocked over and relocked with the plug shaft in alinement with the tapped hole, and the plug or nipple inserted by pushing down and rotating the shaft.

A feature is the small surface displayed against pressure from the main when the latter is tapped through, so that the joints can be readily made to prevent leakage. Another important result obtained is the rigidity and simplicity of the machine which is not injured readily by the rough usage to which it is necessarily subjected.

Obviously, changes in the details of construction may be made without departing from the spirit of the invention, and I do not care to limit myself to any particular form or arrangement of parts.

What I claim as my invention is:—

1. A pipe tapping machine comprising a casing having an apertured foot provided with a concave surface adapted to be seated on a pipe, a member rotatable in the casing in a plane transverse to the axis of curvature of the foot, a longitudinally reciprocable and rotatable tap operating spindle disposed in the member in a plane radial to the curved face of the foot, and a longitudinally reciprocable and rotatable shaft diametrically disposed in the member, the shaft and spindle being severally adapted to be brought into register with the foot aperture by oscillation of the member.

2. A pipe tapping machine comprising a casing having an apertured foot with a concave surface adapted to be seated on a pipe, a member rotatable in the casing in a plane transverse to the axis of curvature of the foot face, a longitudinally reciprocable and rotatable tap operating spindle diametrically disposed in the member, a guide tube extending from the member concentric with the spindle, a sleeve in telescopic screw-threaded engagement with the tube, a yoke bearing inwardly against a shoulder on the outer portion of the spindle adapted to detachably engage the sleeve, and a longitudinally reciprocable and rotatable shaft diametrically disposed in the member, the shaft and spindle being severally adapted to be brought into register with the foot aperture by oscillation of the member.

In testimony whereof I affix my signature in presence of two witnesses.

CYRAL L. FERMAN.

Witnesses:
C. R. STICKNEY,
T. E. BARTHEL.